(12) United States Patent
Tambey

(10) Patent No.: US 10,037,262 B2
(45) Date of Patent: Jul. 31, 2018

(54) ACCELERATED TEST AUTOMATION FRAMEWORK

(71) Applicant: Infosys Limited, Bangalore (IN)

(72) Inventor: Anand Avinash Tambey, Aundh Pune (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/225,917

(22) Filed: Mar. 26, 2014

(65) Prior Publication Data

US 2014/0298296 A1    Oct. 2, 2014

(30) Foreign Application Priority Data

Apr. 1, 2013    (IN) ............................ 1485/CHE/2013

(51) Int. Cl.
*G06F 9/44*       (2018.01)
*G06F 11/36*    (2006.01)

(52) U.S. Cl.
CPC ...... *G06F 11/3672* (2013.01); *G06F 11/3664* (2013.01)

(58) Field of Classification Search
None
See application file for complete search history.

(56) References Cited

U.S. PATENT DOCUMENTS

2004/0194060 A1* 9/2004 Ousterhout .............. G06F 8/41
                                                                    717/120
2010/0293221 A1* 11/2010 Sidman et al. ............... 709/203

* cited by examiner

*Primary Examiner* — Qamrun Nahar
(74) *Attorney, Agent, or Firm* — LeClairRyan PLLC

(57) ABSTRACT

A system for establishing an automation framework includes a script of unresolved references. A reference resolution mechanism resolves the unresolved references to a plurality of software entities. A reusable library communicatively coupled to the reference resolution mechanism collects the resolved references. A recollection mechanism recollects resolved references that are referred to in the script and an execution engine executes the script by referencing the reusable library.

8 Claims, 4 Drawing Sheets

ACCELERATED TEST AUTOMATION FRAMEWORK

RELATED APPLICATIONS

This application claims the benefit of Indian Patent Application Filing No. 1485/CHE/2013, filed Apr. 1, 2013, which is hereby incorporated by reference in its entirety.

FIELD OF THE INVENTION

This disclosure relates generally to automation in software testing process and, more particularly, to method, system and/or apparatus to accelerate test automation.

BACKGROUND OF THE INVENTION

Software testing requires expertise on the part of a tester. Skills required on the part of the tester may include knowledge of scripting languages and know-how to implement accelerators. Software testing requires a large amount of time and needs expertise from testers to achieve automated software testing.

Requirements of expertise, large amounts of time and maintenance costs increase overall costs of software testing and time to market of software.

SUMMARY OF THE INVENTION

Disclosed are a method, an apparatus and/or a system to accelerate test automation.

In one aspect, a method of an automation tool to test a software application for defects includes receiving a script of unresolved references to software entities, resolving each unresolved reference to a software entity, building a reusable library with resolved references, recollecting each of the resolved references generated from the script at runtime and executing the script with the automation tool by referencing the reusable library.

The method an automation tool may include sequentially parsing the script of unresolved references in association with the reference resolution mechanism. Further, executing the script of unresolved references in record mode.

In another aspect, a system for establishing an automation framework includes a script of unresolved references, a reference resolution mechanism that resolves the unresolved references to a plurality of software entities, a reusable library communicatively coupled to the reference resolution mechanism, a recollection mechanism that recollects resolved references that are referred to in the script and an execution engine to execute the script by referencing the reusable library.

The system for establishing the automation framework may include the reusable library that may be built with resolved references. Further, the script associated with unresolved references may execute in record mode.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
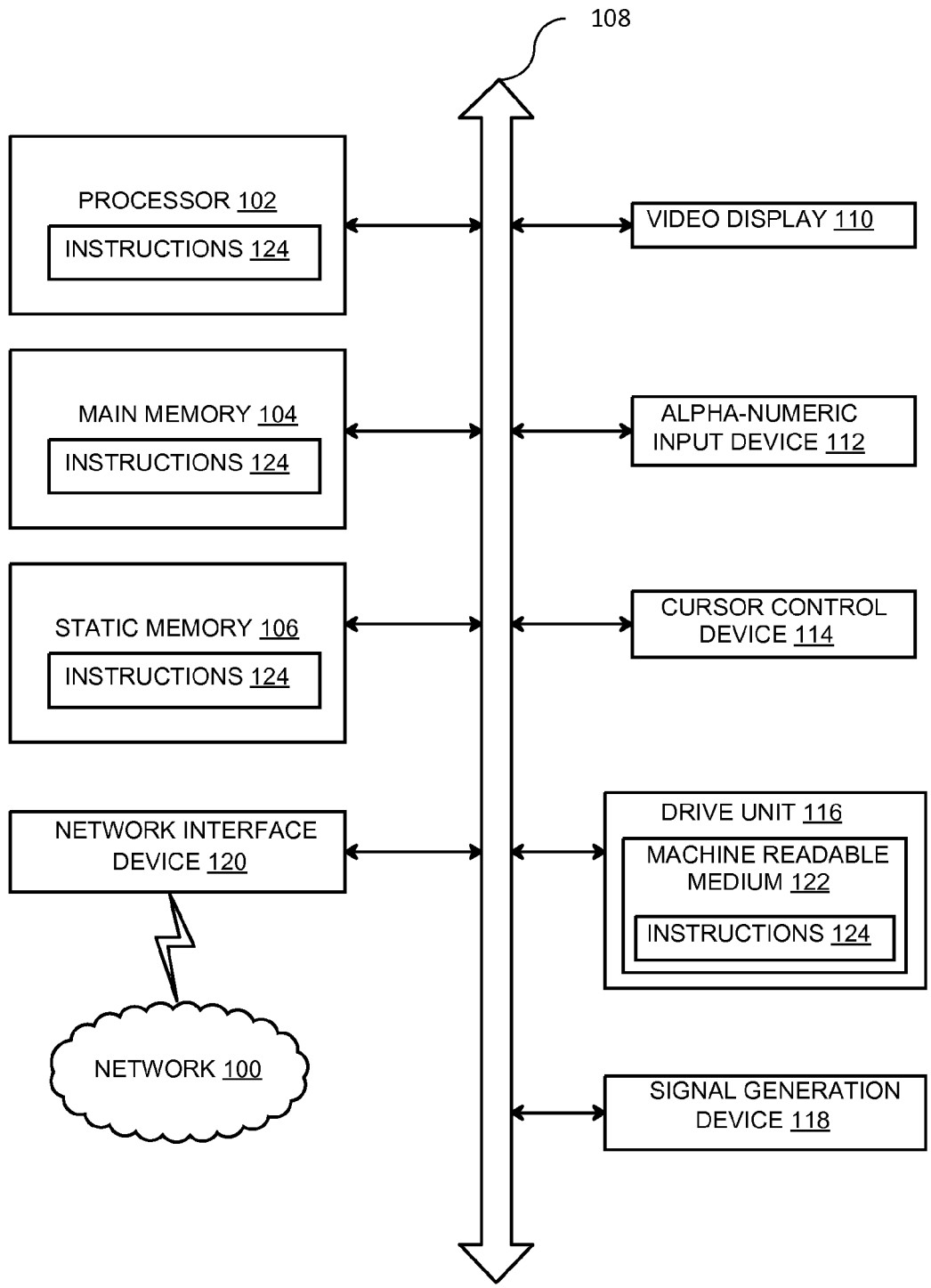
FIG. 1 is a diagrammatic representation of a data processing system capable of processing a set of instructions, according to one or more embodiments.

Other features of the present embodiments will be apparent from the accompanying drawings and from the detailed description that follows.

DETAILED DESCRIPTION OF THE INVENTION

Example embodiments, as described below, may be used to provide a method, an apparatus and/or a system to accelerate test automation. Although the present embodiments have been described with reference to specific example embodiments, it will be evident that various modifications and changes may be made to these embodiments without departing from the broader spirit and scope of the various embodiments.

Software testing tools traditionally need keywords and test data. Test data generation needs expertise in a given area. Expertise may generally involve costs. Software testing tools also need test cases for operation. Test cases of generic and non-generic variety had to be developed.

Software testing complexity increases as a complexity of software code increases. Software testing scales much faster than a software project. One reason for faster scaling of software testing is the need to test new features and need to retest old features. The old features need to be retested to make sure the new features have not broken old features. Therefore, automation of software testing increasingly becomes necessary.

Keyword script approaches where tests are described as a series of keyword actions and parameters involve creation of tables are skills familiar to any programmer.

Tools that provide special purpose scripting languages form yet another conventional approach. Tools such as Hewlett Packard's Quick Test Pro, provide rich scripting languages with test specific extensions built into it. These tools provide a rich coding environment but tend to isolate test cases in their own execution environment.

Overtime, test automation tools have become increasingly complex and difficult to maintain. Framework disclosed herein aims to overcome these difficulties.

High tech software engineering requirements of the present day imply constant pressure to release new and improved products. New and improved products mean higher costs and greater complexity. Thus, search for accelerated test automation becomes ever more important.

In one or more embodiments, a test automation method may include a script being received at a script receiving module. The script may include unresolved references. The script receiving module may resolve the unresolved references into a series of resolved references. The series of resolved references are stored onto a reference library. The reference library may be reusable.

In one or more embodiments, a script may be sent to a matching module. The matching module breaks down script which includes a series of unresolved references to a series of resolved references and matches the series of resolved references to a reusable library that may include the series of resolved references.

In example embodiment, a script may be sent to a matching module at runtime. The matching module may compare the script that includes a series of resolved references to a reusable library and recollect the resolved references. The script may be executed at runtime by referencing the specific references in a reusable library that are referenced by the matching module.

FIG. 1 is a diagrammatic representation of a data processing system capable of processing a set of instructions to perform any one or more of the methodologies herein, according to one embodiment. FIG. 1 shows a diagrammatic representation of machine in the example form of a computer system 100 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and/or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker) and a network interface device 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104 and/or within the processor 102 during execution thereof by the computer system 100, the main memory 104 and the processor 102 also constituting machine-readable media.

The instructions 124 may further be transmitted and/or received over a network 126 via the network interface device 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 2:
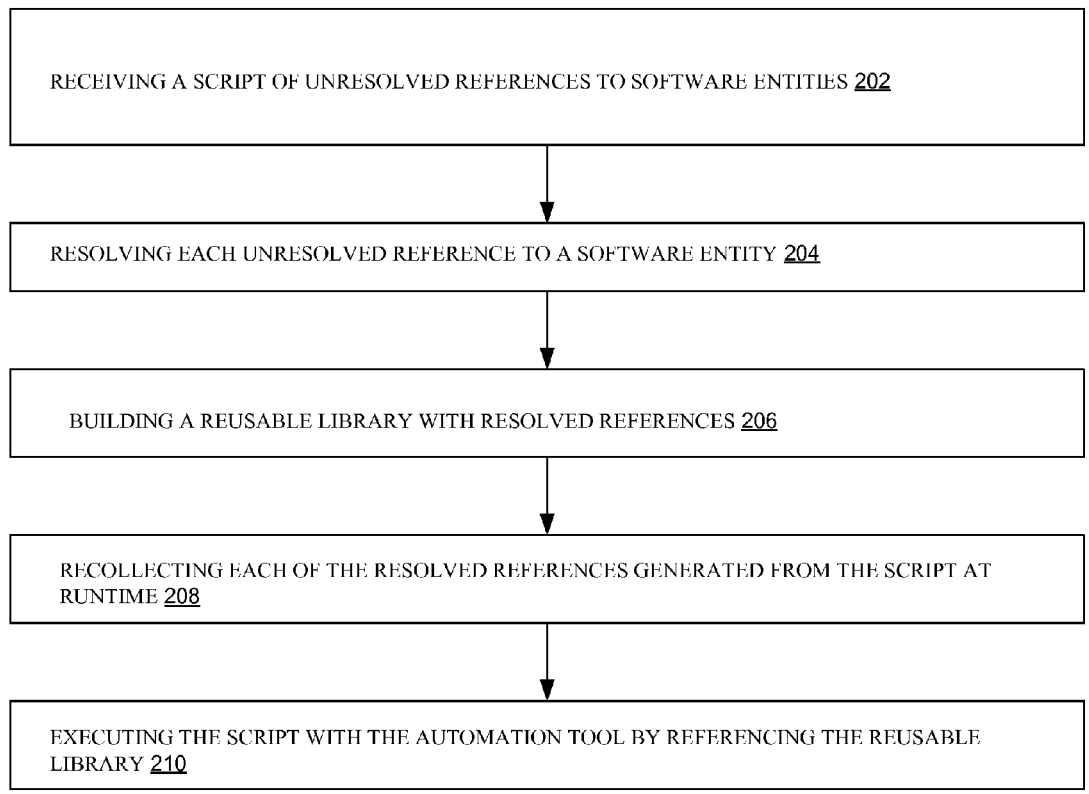
FIG. 2 is a process flow diagram detailing the operation of an accelerated test automation framework, according to one or more embodiments.

FIG. 2 is a process flow diagram that details the method of an accelerated test automation framework. In one or more embodiments, the steps of the method may include receiving a script of unresolved references to software entities 202, Further, each unresolved reference may be resolved to a software entity 204 and a reusable library with resolved references may be built 206. Each of the resolved references generated from the script at runtime may be recollected 208. The script may be executed with the automation tool by referencing the reusable library 210.

Figure 3:
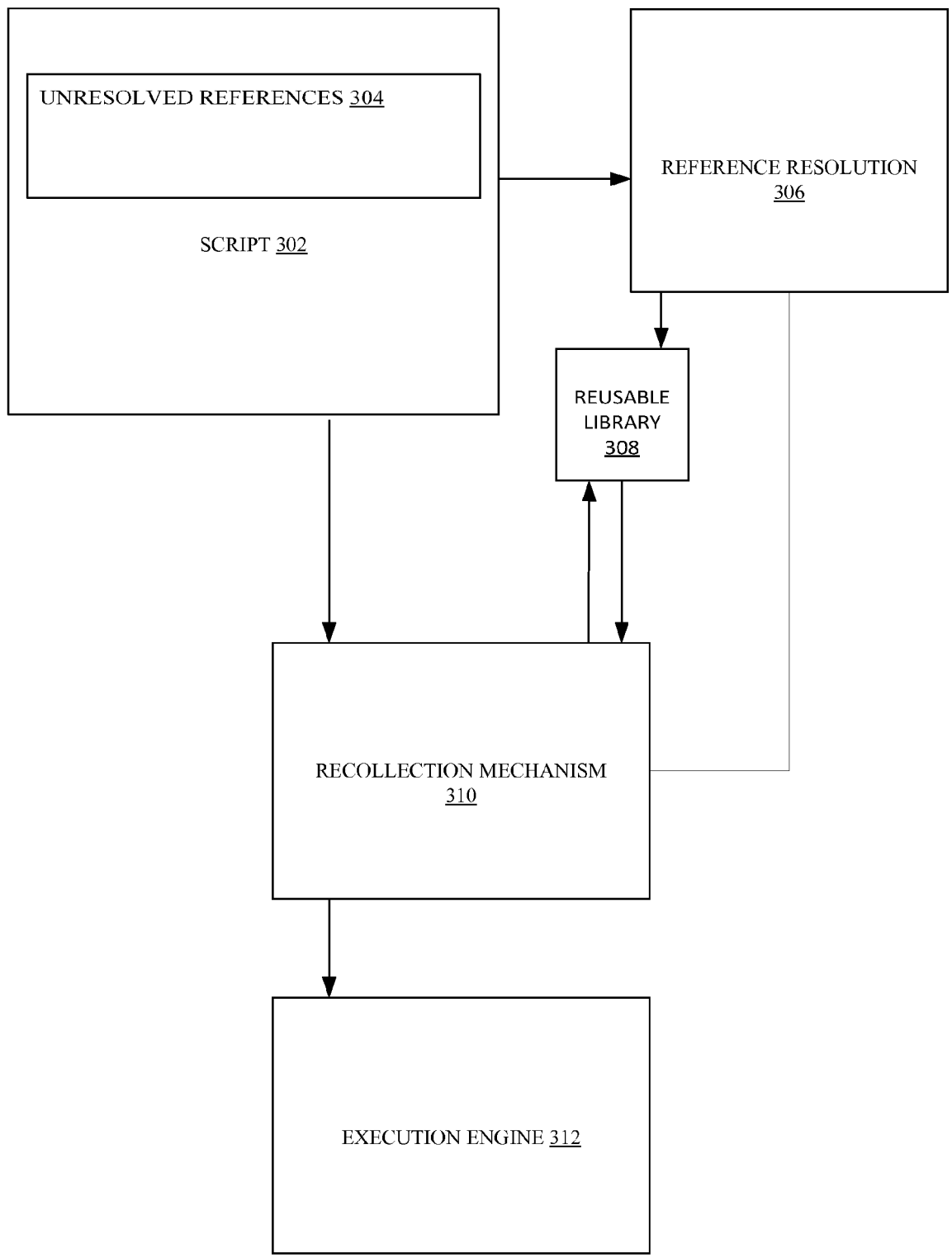
FIG. 3 is a system diagram detailing various components of an accelerated test automation framework, according to one or more embodiments.

FIG. 3 is a system diagram detailing various components of an accelerated test automation framework. In one or more embodiments, a script 302 associated with unresolved references 304 may be parsed by a reference resolution 306 mechanism. The reference resolution 306 mechanism may parse the script 302. The parsing of the script 302 may result in splitting the script 302 into various resolved references. The script 302 may include multiple unresolved references 304 before being parsed. The unresolved references 304 may refer to software entities.

In one or more embodiments, a reusable library 308 may be associated with the reference resolution 306. The reusable library 308 stores all the resolved references that are the result of the parsing the script 302. The reusable library 308 may also be associated with a recollection mechanism 310.

In one or more embodiments, the recollection mechanism 310 may refer to the reusable library to check for entries. The reusable library 308 may have entries for unresolved references 304 that are parsed and then become resolved references. Each time a new script is parsed the recollection mechanism 310 may refer to the reusable library 308 in order to check whether a reference in the script 302 is resolved.

In one or more embodiments, an execution engine 312 in association with the recollection 310 mechanism may determine whether the reference in the script 302 has been resolved. The recollection mechanism 310 determines whether the reference is resolved based on the entries in the reusable library.

Figure 4:
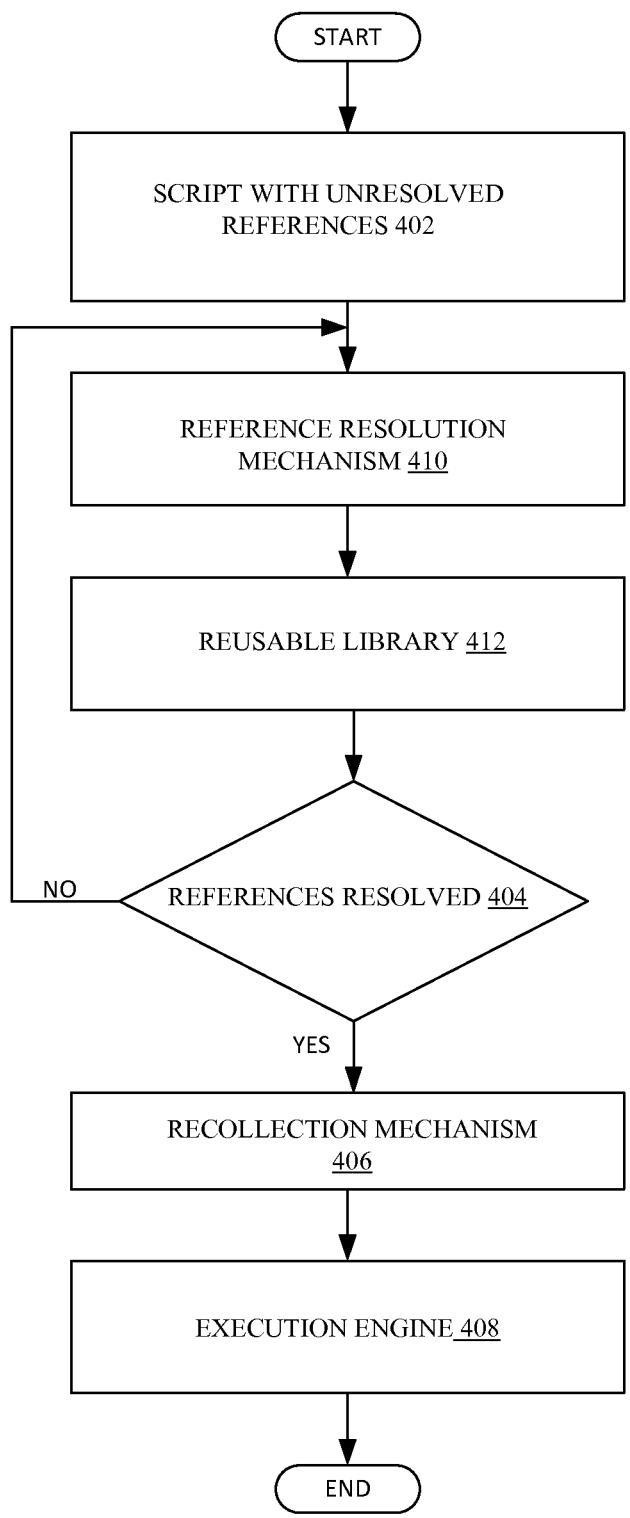
FIG. 4 is a flow chart detailing the steps taken when a script is run on the accelerated test automation framework, according to one or more embodiments.

FIG. 4 is flow chart that details the steps taken when a script 302 is run for the first time on the accelerated test automation framework. In one or more embodiments, a script with unresolved references 402 is parsed before being passed onto a reference resolution mechanism 410. Resolved references may be stored as entries on a reusable library 412.

In an example embodiment, a system for establishing an automation framework may include a script of unresolved references. A reference resolution mechanism may resolve the unresolved references to a plurality of software entities. A reusable library may be communicatively coupled to the reference resolution mechanism collects the resolved references. A recollection mechanism may recollect resolved references that are referred to in the script and an execution engine may execute the script by referencing the reusable library.

In one or more embodiments, each time a script is parsed the execution engine may check whether the references to software entities have been resolved 404. If the references have been resolved the recollection mechanism 406 may refer to the entries associated with the resolved references in the reusable library at runtime. The recollection mechanism 406 may refer the reusable library when the script may be run through the execution engine 408. On parsing if the references have not been resolved the script may be passed onto the reference resolution mechanism 410.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Various operations discussed above may be tangibly embodied on a medium readable through the retail portal to perform functions through operations on input and generation of output. These input and output operations may be performed by a processor. The medium readable through the retail portal may be, for example, a memory, a transportable medium such as a CD, a DVD, a Blu-ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed:

1. A method of an automation tool to test a software application for defects comprising:
    receiving, by a test automation management computing device, a script of unresolved references to software entities;
    resolving, by the test automation management computing device, each unresolved reference in the received script of unresolved references to a software entity to a plurality of resolved references by splitting the received script;
    building, by the test automation management computing device, a reusable library with the plurality of resolved references at a runtime;
    recollecting, by the test automation management computing device, each of the resolved references generated from the script at the runtime, wherein a number of each of the resolved references generated from the script is a constant; and
    executing, by the test automation management computing device, the script with the automation tool by referencing the reusable library.

2. The method of claim 1 further comprising:
    sequentially, by the test automation management computing device, parsing the script of unresolved references in association with the reference resolution mechanism.

3. The method of claim 1 further comprising:
    executing, by the test automation management computing device, the script of unresolved references in record mode.

4. The method of claim 3 wherein the record mode resolves each unresolved reference to a software entity and stores the resolved references in the reusable library.

5. A test automation management computing device comprising:
    a processor;
    a memory, wherein the memory coupled to the processor which are configured to execute programmed instructions stored in the memory to and that comprise:
        receive a script of unresolved references to software entities;
        resolve each unresolved reference in the received script of unresolved references to a software entity to a plurality of resolved references by splitting the received script;
        build a reusable library with the plurality of resolved references at a run time;
        recollect each of the resolved references generated from the script at the runtime, wherein a number of each of the resolved references generated from the script is a constant; and
        execute the script with an automation tool by referencing the reusable library.

6. The device as set forth in claim 5 wherein the processor is further configured to execute programmed instructions stored in the memory further to and that comprise sequentially parse the script of unresolved references in association with the reference resolution mechanism.

7. The device as set forth in claim 5 wherein the processor is further configured to execute programmed instructions stored in the memory further to and that comprise execute the script of unresolved references in record mode.

8. The device as set forth in claim 7 wherein the record mode resolves each unresolved reference to a software entity and stores the resolved references in the reusable library.

* * * * *